Oct. 26, 1943.   C. F. GREINER   2,333,003
CLUTCH SLEEVE
Filed Dec. 30, 1941   2 Sheets-Sheet 1
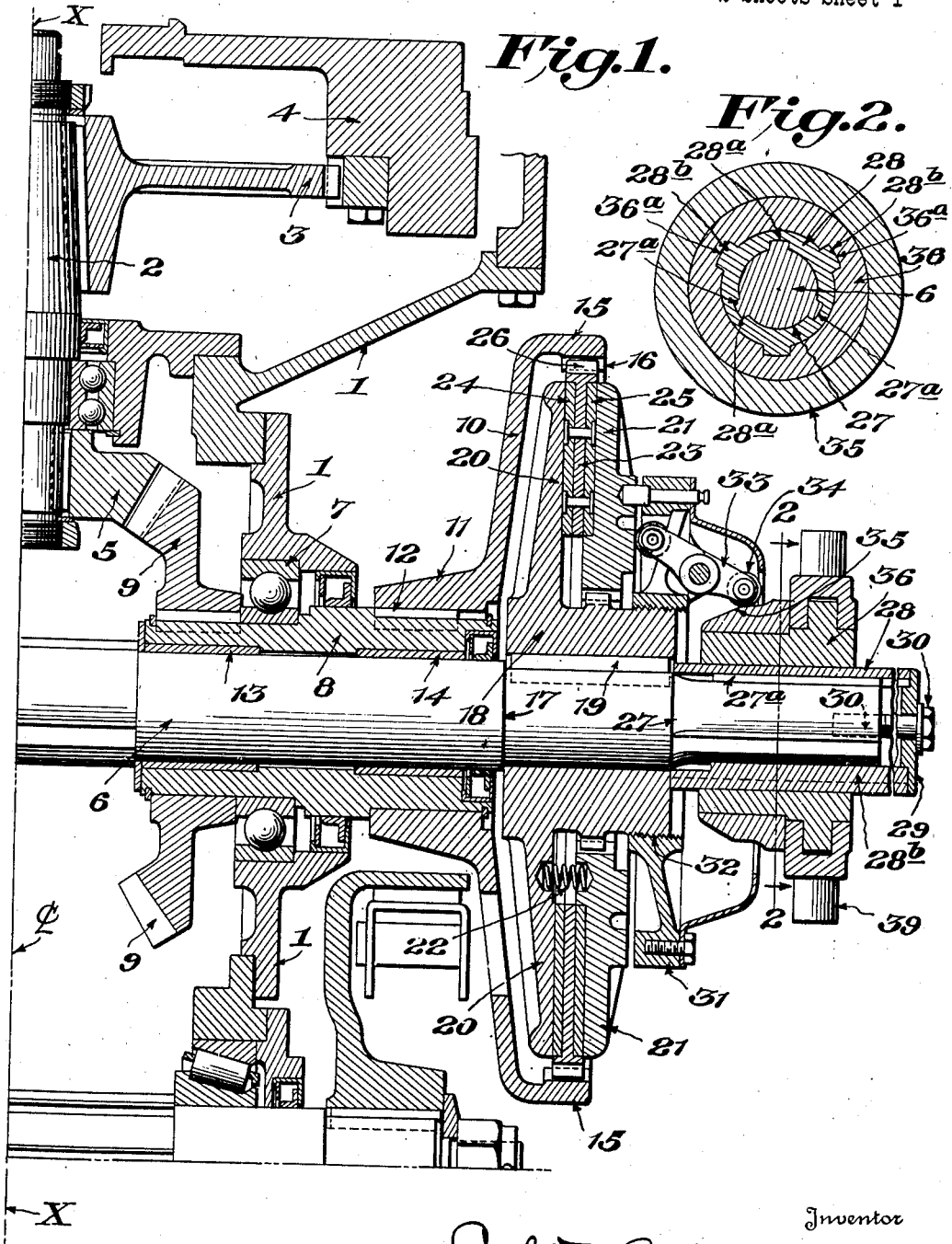

Oct. 26, 1943.  C. F. GREINER  2,333,003
CLUTCH SLEEVE
Filed Dec. 30, 1941  2 Sheets-Sheet 2

Inventor
Carl F. Greiner
By Alexander Dowell
Attorneys

Patented Oct. 26, 1943

2,333,003

UNITED STATES PATENT OFFICE 2,333,003

CLUTCH SLEEVE

Carl F. Greiner, Springfield, Ohio, assignor to The Buffalo-Springfield Roller Co., Springfield, Ohio, a corporation of Ohio Application December 30, 1941, Serial No. 424,997

12 Claims. (Cl. 192—68)

This invention relates to clutch assemblies particularly adapted for use in heavy vehicles, such as road rollers, which during normal operation are driven substantially equal periods in forward and reverse directions, and the principal object thereof is to provide in such assembly a novel sleeve having grooves in its bore receiving integral splines on the clutch shaft and clamping the clutch hub between the end of the sleeve and a shoulder on the clutch shaft, said sleeve also having integral splines on its exterior entering grooves in the bore of the cone hub, said sleeve thereby replacing the usual key in such assemblies mounted in a keyway in the shaft and extending through a slot in the sleeve and into a keyway in the cone hub, which key due to its abnormal unsupported height above the shaft is subject to rocking movements in its keyways due to the constant reversals of the clutch shaft and to the torque required to start or stop rotation of the clutch cone and hub due to its weight, said rocking movements resulting after a short period of use in failure of the key, and damage to the shaft, sleeve, key, or cone hub.

The use of my novel clutch sleeve however permits clamping of the clutch hub by the sleeve in the usual conventional manner; and my sleeve furthermore serves as an equivalent for a plurality of keys while eliminating the hazard of loose keys and the hazard of shaft or hub damage, due to constant reversals of the clutch shaft which is usually rotated at speeds of 1000 R. P. M. or more.

I will explain the invention with reference to the accompanying drawings which illustrate one practical embodiment thereof to enable others familiar with the art to adopt and use the same; and will summarize in the claims, the novel features of construction, and novel combination of parts, for which protection is desired.

In said drawings:

Fig. 1 is a horizontal section through a portion of a clutch assembly embodying my invention, on the common plane of the axes of the main drive shaft and the clutch shaft.

Fig. 2 is a transverse section on the line 2—2, Fig. 1.

Figure 3:
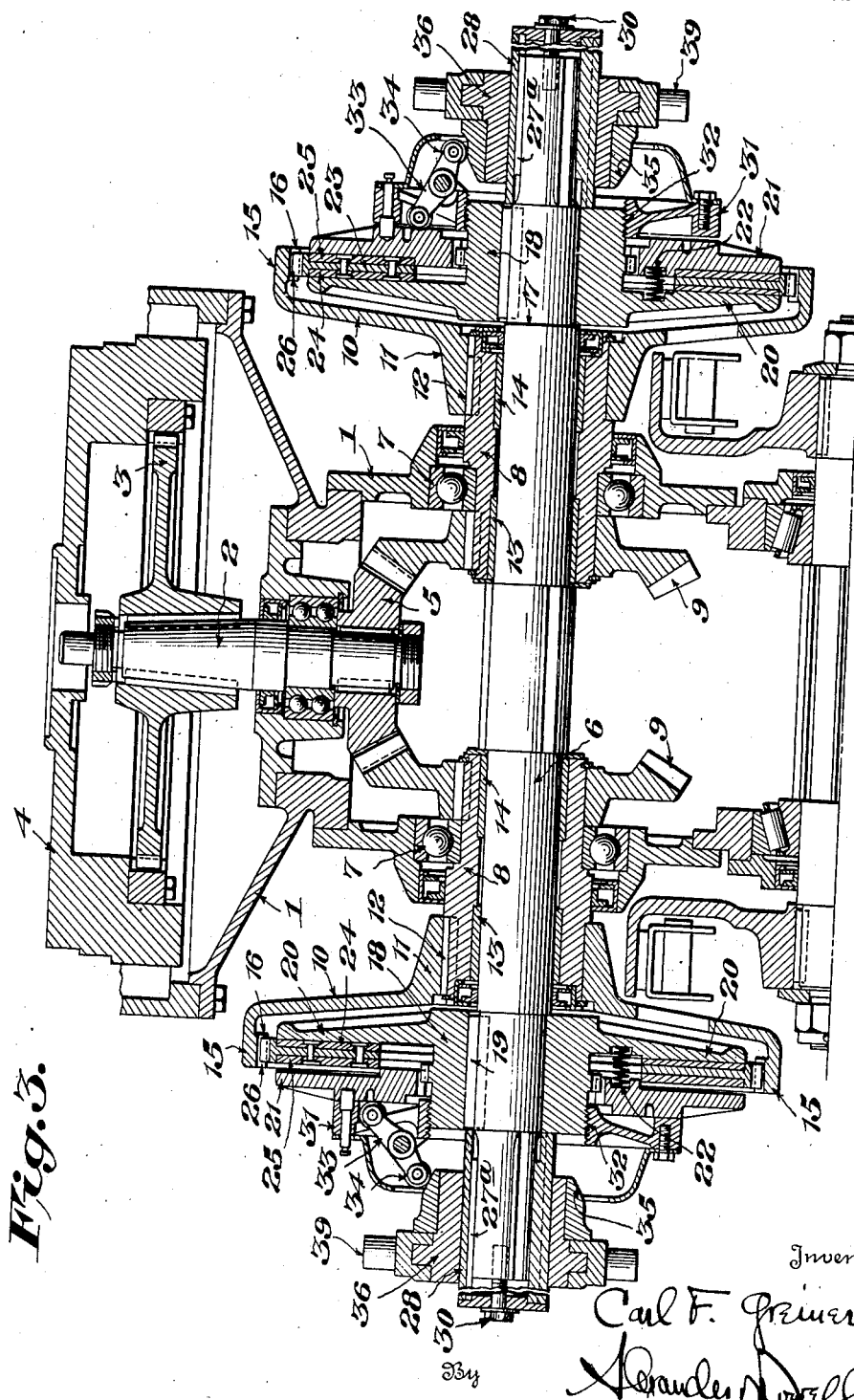
Fig. 3 is a horizontal section similar to Fig. 1, but showing the complete clutch assembly.

As shown, the clutch assembly includes a clutch housing 1 in which is journaled a main drive shaft 2 carrying a gear 3 driven from the flywheel 4 or other part of the engine or motor (not shown), drive shaft 2 being mounted in suitable bearings in housing 1 and carrying on one end a spiral bevel pinion 5 which forms the main driving pinion of the assembly. Opposite the pinion 5 and disposed normal to the axis of main drive shaft 2 is a clutch shaft 6 journaled in suitable antifriction bearings 7 mounted in the walls of housing 1. It being understood that the construction shown in Fig. 1 to the right of the center-line X—X is duplicated at the other side of the center-line X—X in the actual shaft assembly, and both sides being symmetrical, it is merely necessary to illustrate and describe one side of the assembly, i. e., that shown in Fig. 1.

Clutch shaft 6 floats in its bearings, same having a sleeve 8 extending at opposite sides of the antifriction bearing 7 which engages said sleeve directly, sleeve 8 carrying at its inner end a spiral bevel gear 9 in constant mesh with spiral bevel pinion 5 of main drive shaft 2, whereby sleeve 8 will be driven by the drive shaft 2 which normally would be driven at substantially constant speed.

At the opposite end of sleeve 8 is a clutch driving drum 10 having a hub 11 keyed, as at 12, to sleeve 8 so as to rotate therewith. Antifriction bearing 7 is interposed between clutch housing 1 and sleeve 8, and bushings 13 and 14 are interposed between the bore of sleeve 8 and the clutch shaft 6, whereby the shaft 6 may float in its bearings, the same being journaled in the constantly rotating sleeve 8. Clutch driving drum 10 is provided with a cylindrical portion 15 at its periphery concentric with shaft 6, and an internal annular series of teeth 16 are formed within the cylindrical portion 15.

Shaft 6, beyond the hub 11 of clutch driving drum 10, is reduced in diameter as at 17, and a clutch hub 18 is keyed as at 19 upon the reduced portion 17 so as to rotate shaft 6 when the clutch is engaged. Clutch hub 18 has a disk portion 20 adjacent its inner end extending within the cylindrical portion 15 of clutch driving drum 10, disk portion 20 being of less diameter than the annular teeth 16. Splined upon clutch hub 18 is a clamping disk 21 of substantially the same diameter as the disk 20, clamping disk 21 being normally urged outwardly away from the disk 20 by means of springs 22 disposed between the disks 20 and 21.

Between clutch disk 20 and clamping disk 21 is a plate 23 having riveted to opposite faces thereof friction facings 24, 25; and at the periphery of plate 23 are teeth 26 meshing with the teeth 16 of the cylindrical portion 15 of clutch driving drum 10, whereby the plate 23 will be constantly rotated by clutch drum 10 so that when the clamping plate 21 is moved toward the clutch plate 20 the plate 23 will be clamped therebetween and the clutch will be engaged and the clutch shaft 6 will be rotated by and with the clutch drum 10. When however the clamping disk 21 is moved away from the disk 20 the springs 22 will hold the members 21 and 20 separated in order to permit the clutch shaft 6 to remain idle or in fact to be rotated in the opposite direction, while the clutch drum 10 is being rotated by and with the drive shaft 2.

Shaft 6, beyond the reduced portion 17, is further reduced as at 27, and a clamping sleeve 28 extends over the reduced portion 27 of shaft 6 with its inner end engaging the outer face of clutch hub 18. The outer end of sleeve 28 extends somewhat beyond the outer end of the reduced portion 27 of shaft 6 and a washer 29 engages the outer end of sleeve 28. A bolt 30 transfixes the washer 29 and is threaded into a tapped bore in the reduced end 27 of shaft 6, whereby when bolt 30 is tightened the sleeve 28 will be urged inwardly on shaft portion 27 to take up any looseness between clutch hub 18 and the shoulder formed by the reduced portion 17 of shaft 6, in order to maintain the clutch hub in firm engagement with said shoulder and to prevent slack.

The means for shifting the clamping disk 21 comprises a collar 31 threaded, as at 32, upon the outer end of clutch hub 18, said collar thereby rotating with said hub. Collar 31 carries a plurality of rocking fingers 33 normally inclined with respect to the axis of shaft 6, said fingers adapted, when swung to positions substantially parallel with the axis of shaft 6, to shift the clamping plate 21 towards the disk 20. Fingers 33 carry on their outer ends rollers 34 adapted to ride upon a conical cam 35 carried by a cone hub 36, which hub is splined upon the sleeve 28 so as to rotate with the shaft 6. The specific details whereby the rocking fingers 33 serve to shift the clamping disk 21 towards the disk 20 of hub 18 form no part of my present invention.

Heretofore in clutch assemblies of the above type, it has been necessary to provide a key in a keyway in the reduced portion 27 of the shaft 6, said key extending through a slot in the sleeve 28 extending substantially the full length of the sleeve, said key entering a keyway in the cone hub 36, but due to the unsupported height of the key above the reduced portion 27 of the shaft, and to the speed of the clutch shaft and to the weight of the clutch cone and hub assembly, the constant reversals of the vehicle drive would rock or tend to rock the key in its keyways, and after a relatively short length of time the key would be damaged, causing failure of the shaft, the sleeve, the key, or the cone hub. In order to obviate said failures and at the same time to permit use of the above conventional assembly which provides for clamping of the clutch hub 18, as aforesaid, I preferably use a novel clutch sleeve 28 such as shown more particularly in Fig. 2, said sleeve eliminating the hazard of loose keys and damage to the shaft or cone hub, and furthermore serving as the equivalent of three fixed keys.

As shown in Fig. 2, the bore of the sleeve 28 is provided with three equally spaced grooves 28a receiving integral splines 27a on the reduced portion 27 of shaft 6, said keyways 28a and integral splines 27a serving more efficiently the same function as three separate keys but providing a construction which is much more durable. The exterior of sleeve 28 is provided with three integral splines 28b entering corresponding grooves 36a in the bore of cone hub 36, the integral splines 28b being preferably disposed intermediate the grooves 28a of the sleeves. Thus the sleeve 28 is splined directly to the reduced portion 27 of the shaft and also splined directly to the cone hub 36 by means of ribs formed integrally on the shaft and sleeve forming an efficient and durable construction obviating the use of separate keys, and obviating the necessity of having to provide a slot for the key extending through the sleeve 28 substantially the full length of said sleeve.

As before stated, it is understood that the construction shown in Fig. 1 is reproduced in symmetrical form at the opposite side of the centerline X—X as shown in Fig. 3 to provide a clutch assembly in which the shaft 6 may be rotated in opposite directions according to which of the two clutches is engaged or disengaged.

In practice, the cone hub 36 at each end of shaft 6 would be engaged by a single clutch actuating member having forks 39 and an operating lever (not shown), whereby when the lever is swung into neutral position the cams 35 of the opposed cone hubs 36 at opposite ends of shaft 6 would both be disengaged from the rocking fingers 33 of their related clutches, and thus both clutches would be open and the shaft 6 would be stationary although the spiral bevel gears 9 of both clutches were rotating.

When the operating lever is swung to one side the forward drive clutch would be engaged while the reverse drive clutch would be disengaged. When the operating lever is thrown in the opposite direction the reverse drive clutch would be engaged while the forward drive clutch would be disengaged. The clutch shaft 6 drives through suitable change speed gearing (not shown) the drive axles or drive wheels of the vehicle.

I do not limit my invention to clutch assemblies for road rollers for obviously the same may be utilized in any assembly which includes a sleeve interposed between a member splined upon a shaft and adapted to be rotated by the said shaft.

I claim:

1. In a clutch assembly, a shaft having a reduced portion; a clutch hub keyed on said reduced portion; said shaft having a further reduced portion; a sleeve splined upon said further reduced portion with its inner end engaging the clutch hub to maintain the hub fixedly mounted on said first reduced portion; means for adjusting the sleeve towards the hub; and an axially movable clutch actuating member splined upon said sleeve.

2. In an assembly as set forth in claim 1, said sleeve having grooves and integral splines engaging integral splines and grooves of the shaft and member.

3. In an assembly as set forth in claim 1, said shaft having an annular series of integral splines engaging an annular series of grooves in the bore of the sleeve; and said sleeve having an annular series of integral splines on its exterior engaging an annular series of grooves in the bore of the member.

4. In an assembly as set forth in claim 1, said further reduced portion of the shaft having an annular series of integral splines engaging an annular series of grooves in the bore of the sleeve; and said sleeve having an annular series of integral splines on its exterior engaging an annular series of grooves in the bore of the member; the splines and grooves of the sleeve alternating and being equidistantly spaced.

5. In a clutch assembly, a floating clutch shaft, a clutch driving drum rotatably mounted thereon; means for rotating the drum; a clutch hub cooperating with said clutch drum and keyed to a reduced portion of said shaft and contacting the shoulder formed by said reduced portion; a sleeve splined upon said shaft and adapted to engage the outer face of the hub and extending beyond the end of the shaft; means for shifting the sleeve inwardly of the shaft; a clutch actuator splined upon said sleeve; and means on the clutch hub actuated by the actuator for engaging and disengaging the clutch hub with respect to the clutch driving drum.

6. In an assembly as set forth in claim 5, said sleeve having grooves and integral splines engaging integral splines and grooves of the shaft and clutch actuator.

7. In an assembly as set forth in claim 5, the ends of the shaft beyond the hubs being further reduced; and said shaft having one or more integral splines engaging grooves in the bore of the sleeve; and said sleeve having one or more integral splines on its exterior engaging grooves in the bore of the actuator.

8. In an assembly as set forth in claim 5, the ends of the shaft beyond the hubs being further reduced; and said shaft having one or more integral splines engaging grooves in the bore of the sleeve; and said sleeve having one or more integral splines on its exterior engaging grooves in the bore of the actuator; the splines and grooves of the sleeve alternating and being equidistantly spaced.

9. In a clutch assembly, a floating clutch shaft, a pair of clutch driving drums rotatably mounted on said shaft; means for rotating the drums in opposite directions; clutch hubs cooperating with said clutch drums respectively and keyed to reduced portions of said shaft and contacting the shoulders formed by said reduced portion; sleeves splined upon said shaft ends and adapted to engage the outer faces of the hubs and extending beyond the ends of the shaft; means for shifting the sleeves inwardly of the shaft; clutch actuators splined upon said sleeves; and means on the clutch hubs actuated by the actuators for engaging and disengaging the clutch hubs with respect to the clutch driving drums.

10. In an assembly as set forth in claim 9, said sleeves having grooves and integral splines engaging integral splines and grooves of the shaft and actuators.

11. In an assembly as set forth in claim 9, the ends of the shaft beyond the hubs being further reduced; and said shaft having one or more integral splines engaging grooves in the bore of the sleeve; and said sleeve having one or more integral splines on its exterior engaging grooves in the bore of the actuator.

12. In an assembly as set forth in claim 9, the end of the shaft beyond the hubs being further reduced; and said shaft having one or more integral splines engaging grooves in the bore of the sleeve; and said sleeve having one or more integral splines on its exterior engaging grooves in the bore of the actuator; the splines and grooves of the sleeve alternating and being equidistantly spaced.

CARL F. GREINER.